US009992135B2

(12) United States Patent
Khare et al.

(10) Patent No.: US 9,992,135 B2
(45) Date of Patent: Jun. 5, 2018

(54) APPARATUS AND METHOD FOR FUSION OF COMPUTE AND SWITCHING FUNCTIONS OF EXASCALE SYSTEM INTO A SINGLE COMPONENT BY USING CONFIGURABLE NETWORK-ON-CHIP FABRIC WITH DISTRIBUTED DUAL MODE INPUT-OUTPUT PORTS AND PROGRAMMABLE NETWORK INTERFACES

(71) Applicant: INTEL CORPORATION, Santa Clara, CA (US)

(72) Inventors: Surhud Khare, Bangalore (IN); Dinesh Somasekhar, Portland, OR (US); Ankit More, Hillsboro, OR (US); David S. Dunning, Portland, OR (US); Nitin Y. Borkar, Portland, OR (US); Shekhar Y. Borkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/967,166

(22) Filed: Dec. 11, 2015

(65) Prior Publication Data
US 2017/0171111 A1 Jun. 15, 2017

(51) Int. Cl.
H04L 12/28 (2006.01)
H04L 12/935 (2013.01)
H04L 12/933 (2013.01)
H04L 12/721 (2013.01)

(52) U.S. Cl.
CPC ............ H04L 49/30 (2013.01); H04L 45/72 (2013.01); H04L 49/101 (2013.01)

(58) Field of Classification Search
CPC combination set(s) only.
See application file for complete search history.

(56) References Cited

U.S. PATENT DOCUMENTS

| 7,581,081 | B2* | 8/2009 | Gonzalez | G06F 15/8023 709/213 |
| 8,327,187 | B1* | 12/2012 | Metcalf | G06F 13/4221 714/10 |
| 8,531,943 | B2* | 9/2013 | Olofsson | G06F 15/17381 370/229 |
| 9,424,213 | B2* | 8/2016 | Dobbs | G06F 15/76 |
| 2009/0024833 | A1* | 1/2009 | Deneroff | G06F 15/17343 712/29 |
| 2012/0170582 | A1* | 7/2012 | Abts | H04L 45/06 370/392 |

(Continued)

FOREIGN PATENT DOCUMENTS

WO WO 2017/138992 8/2017

Primary Examiner — Frank Duong
(74) Attorney, Agent, or Firm — Alliance IP, LLC

(57) ABSTRACT

Described is an apparatus which comprises: a Network-On-Chip fabric using crossbar switches, having distributed ingress and egress ports; and a dual-mode network interface coupled to at least one crossbar switch, the dual-mode network interface is to include: a dual-mode circuitry; a controller operable to: configure the dual-mode circuitry to transmit and receive differential signals via the egress and ingress ports, respectively, and configure the dual-mode circuitry to transmit and receive signal-ended signals via the egress and ingress ports, respectively.

23 Claims, 9 Drawing Sheets

(56) References Cited

U.S. PATENT DOCUMENTS

2014/0376557 A1* 12/2014 Park .................. G06F 15/17381
  370/400
2015/0071282 A1*  3/2015 Anders ................. H04L 49/109
  370/353
2016/0344629 A1* 11/2016 Gray ....................... H04L 45/60

* cited by examiner

320

| Mask Value | Match Value | Destination Port ID |
|---|---|---|
| 0X3FFFFFFF00000000 | 0X3F10000000000000 | 00000 |
| 0X3FFFFFF800000000 | 0X3FFF800000000000 | 00001 |
| 0X3FC0EF0000000000 | 0X3FC0000000000000 | 00010 |
| .... | .... | .... |

| Address Range Lower Bound | Address Range Upper Bound | Operation |
|---|---|---|
| 0X00000000FF000000 | 0X00000000FFFFFFFF | ADD 0XFFFF |
| 0X00000000FFFFFFFF | 0X0000FFFFFFFFFFFF | ADD 0XFFFA |
| 0XFFFF000000000000 | 0XFFFFFFFF00000000 | SHIFT LEFT BY 16 bits |
| .... | .... | .... |

Fig. 3C

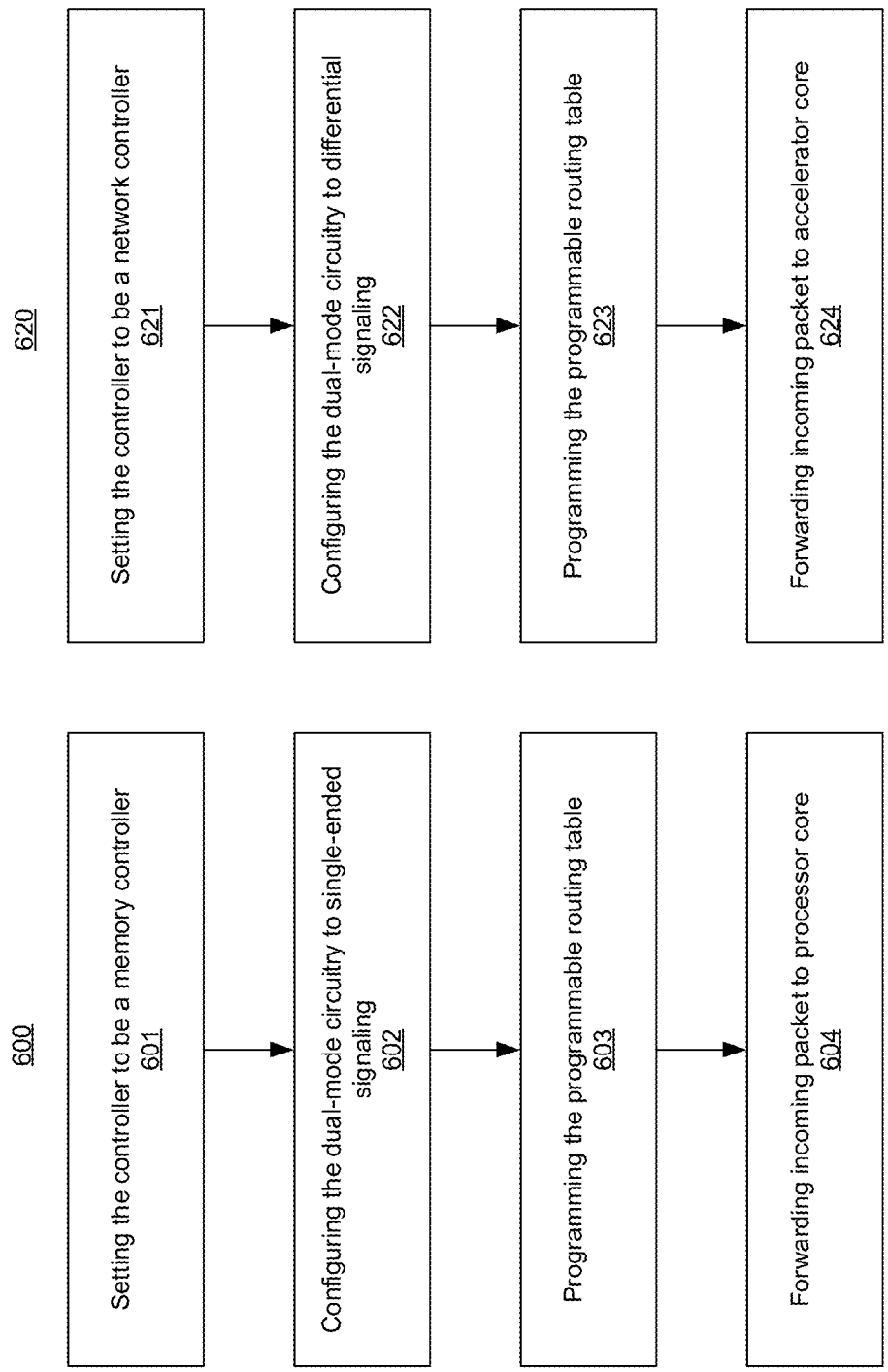

APPARATUS AND METHOD FOR FUSION OF COMPUTE AND SWITCHING FUNCTIONS OF EXASCALE SYSTEM INTO A SINGLE COMPONENT BY USING CONFIGURABLE NETWORK-ON-CHIP FABRIC WITH DISTRIBUTED DUAL MODE INPUT-OUTPUT PORTS AND PROGRAMMABLE NETWORK INTERFACES

GOVERNMENT LICENSE RIGHTS

This invention was made with Government support under contract number B608115 awarded by the Department of Energy. The Government has certain rights in this invention.

BACKGROUND

Exascale systems are projected to integrate on the order of 100,000 processor nodes, with each node capable of providing 8-16 TFLOP/s (trillion floating-point operations per second) peak compute performance. The interconnect fabric of such systems is expected to have approximately 10,000 to 30,000 switch components. With such levels of scale-up, it may be essential that the two key silicon components—namely Processor and Switch—are architected to achieve energy efficiency and performance within the cost targets for such systems. A Processor is an array of a large number of compute cores with memories, interconnected using an on-die interconnect fabric while a switch is primarily just the on-die interconnect fabric which provides connectivity between input-output (IO) ports.

Achievable IO bandwidths for processor/switch components are limited by capabilities of low-cost packaging and energy-efficient signaling technologies. While a die size of the processor is determined by compute logic area required to achieve target performance, a die size of the switch is dictated by the number of IO pins required on the periphery to support the targeted bandwidth. Actual logic area for the switch is miniscule in comparison, resulting into significant "white space" in the silicon. Considering very high cost of mask-sets used for chip fabrication and relatively lower volume requirements of switches, designing standalone switch components is not very cost-effective approach.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 3B illustrates a Programmable Routing Table of the dual-port switch, in accordance with some embodiments of the disclosure.

FIG. 3C illustrates an Address Translation/Mapping Table of the dual-port switch, in accordance with some embodiments of the disclosure.

FIG. 6A illustrates flowchart of a method for configuring a fused component as processor FIG. 6B illustrates a flowchart of a method for configuring the NoC as a processor or switch, according to some embodiments of the disclosure.

DETAILED DESCRIPTION

Figure 1B:
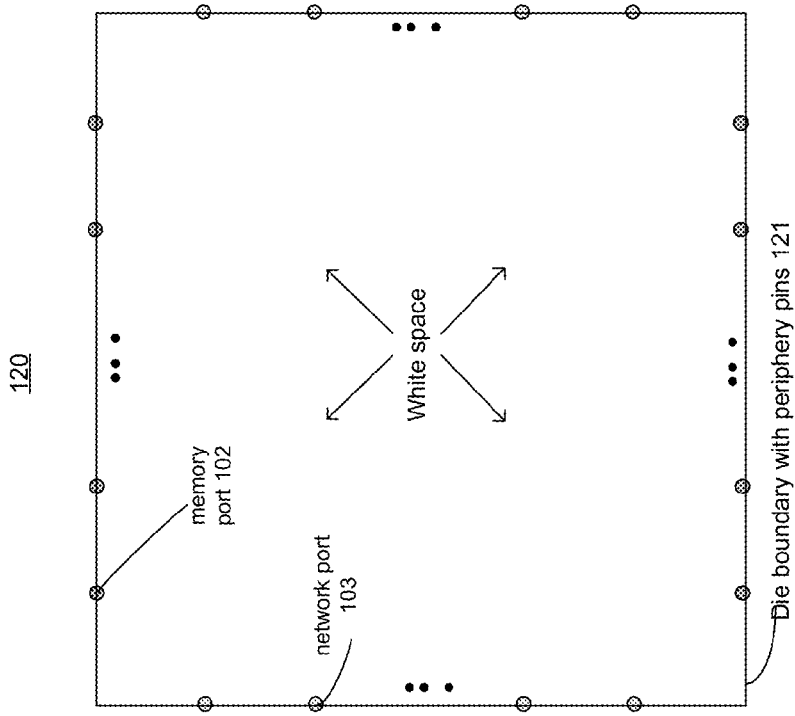
FIG. 1B illustrates boundary of switch chip with NoC and with periphery pins of ports and along the chip boundary line.

Various embodiments describe a converged on-die fabric/component architecture for High Performance Computing (HPC) such as Exascale systems, and fuse computing and switching functionality into a single component with integrated compute cores, memories, on-die interconnect fabric, and off-die interconnect interfaces. Exascale computing generally refers to computing systems capable of at least one exaFLOPS, or a billion billion calculations per second. In some embodiments, the fused component can either function as a processor, a switch, or both. In some embodiments, compute/accelerator cores in a switch can be employed to provide computation capabilities (such as packet processing) in the interconnect fabric. In some embodiments, software, hardware, and/or firmware defined interconnect infrastructure is used that allows for programming the switch to dynamically reconfigure a system architecture and/or performance.

For example, with a software or firmware interface (such as those in processors), a chip or Network-on-Chip (NoC) can be dynamically reconfigured to operate as a HPC processor or as a network processor. Field-Programmable gate arrays (FPGAs) are known to offer chip programmability. However, FPGAs are not capable of HPC. The approach described in accordance with some embodiments can reduce the non-recurring engineering (NRE) development and manufacturing costs, and also provide programmability and computational capabilities in the interconnect fabric—that may be functionally identical to that of the processor. Other technical effects will be evident from the various embodiments described here.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various circuits, modules, and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

Figure 1A:
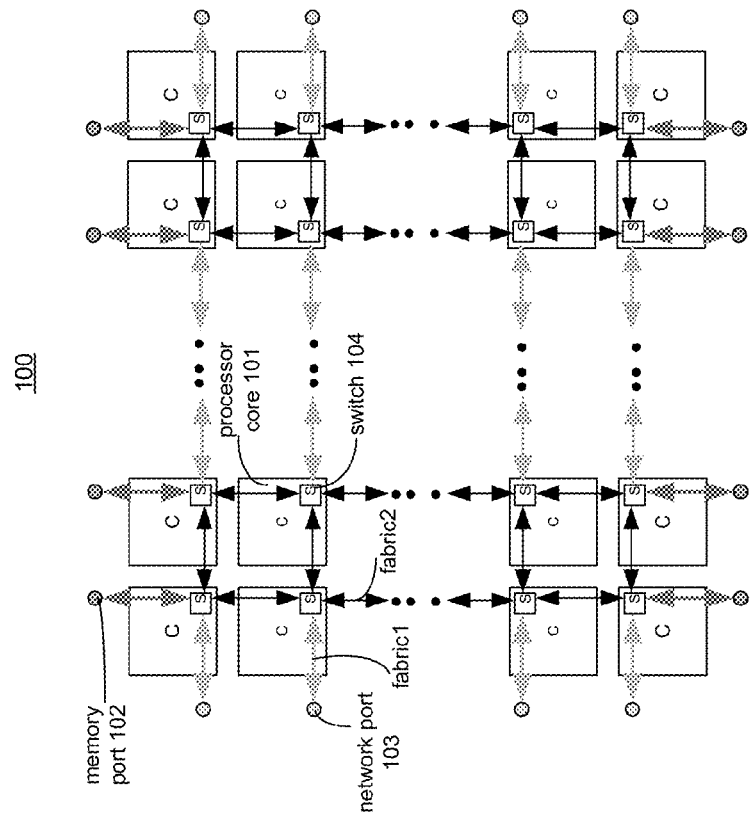
FIG. 1A illustrates a processor chip (or switch) implemented as a Mesh Network-on-Chip (NoC), where switch results in large white space

FIG. 1A illustrates a processor chip (or switch) 100 implemented as a Mesh NoC, where switch 100 results in large white space. Switch 100 (also referred to as switch NoC) is a typical architecture of on-die interconnect fabric and memory/network IO connectivity. Switch 100 includes a plurality of compute blocks 101, memory ports 102, network ports 103, switches 104, and interconnect fabrics (e.g., fabric1 and fabric2). Fabric1 and fabric2 can be of mesh, torus, or tree configurations. Here, compute block 101 may consist of one of one or more processor cores, memories and accelerator engines, and is represented by 'C'. Each compute block 101 is associated with a block-level switch 104 which is represented by 'S'. Multiple such switches are interconnected together to form an on-die interconnect fabric (e.g., fabric1 and fabric2). External Memory and network IO ports 102 and 103, respectively, are typically connected on the periphery/edges of the on-die fabric as shown by FIG. 1B.

FIG. 1B illustrates boundary 120 of switch chip with NoC and with periphery pins of ports 102 and 103 along the chip boundary line 121. While die size of Switch 100 will be determined by compute logic area required to achieve target performance, die size of the switch is dictated by the number of IO pins 121 required on the periphery. Actual logic area for the switch NoC is miniscule in comparison, resulting in lots of white space. Here, the NoC used for implementing switch 100 can result in white space since die size for switch 100 is dictated by perimeter required for external IOs (bumps) and NoC logic area is much smaller in comparison. Fabricating chips (such as Switch NoC in FIG. 1B) where considerable silicon area is unused, is therefore not a cost effective solution.

Figure 2A:
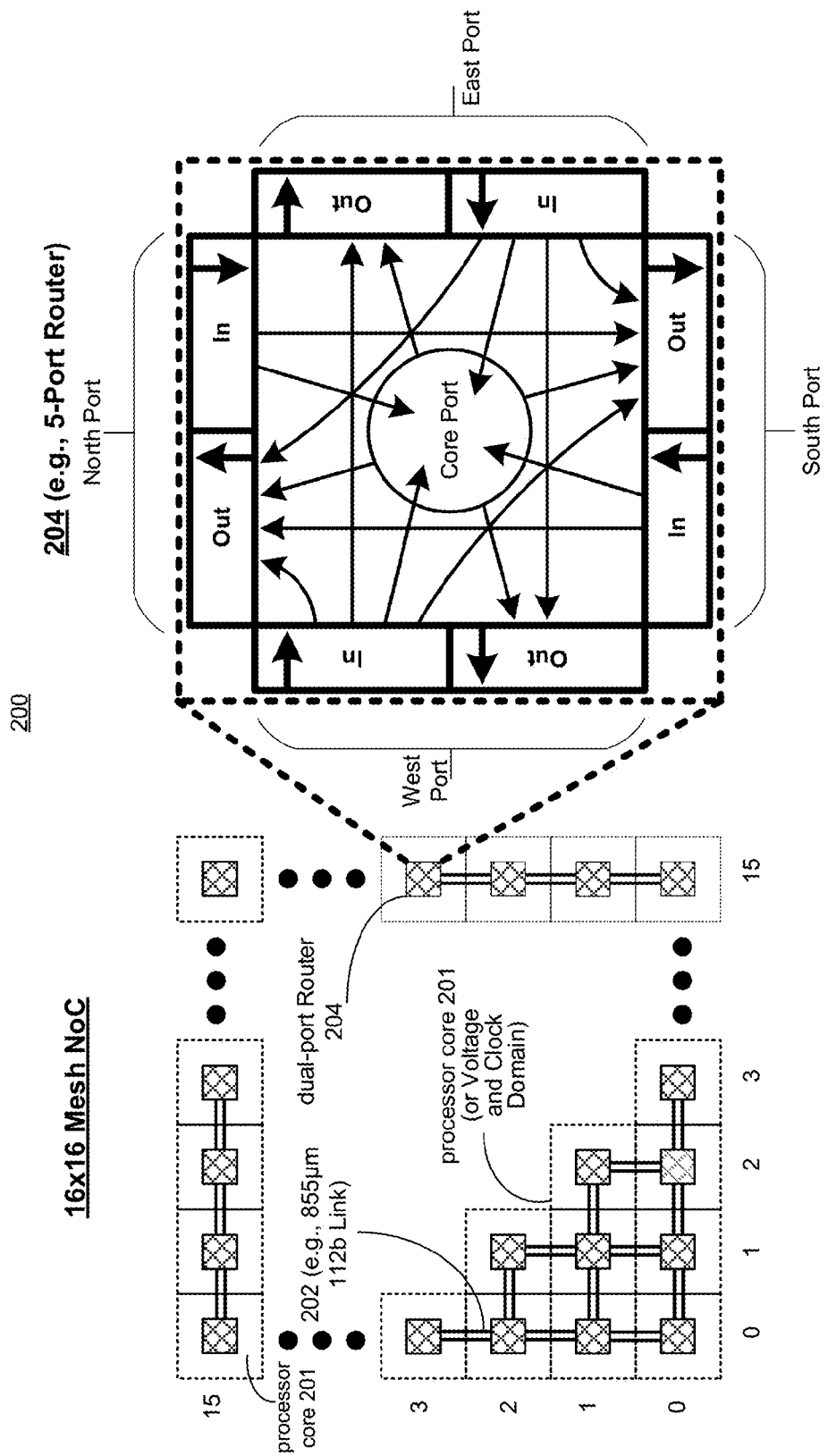
FIG. 2A illustrates a NoC with dual-mode routers or switches for one or more dies in the NoC, according to some embodiments of the disclosure.

FIG. 2A illustrates NoC 200 with dual-mode routers or switches for one or more dies in NoC 200, according to some embodiments of the disclosure. In some embodiments, NoC 200 comprises a plurality of processors 201, links 202, and a network of dual-mode routers 204. In some embodiments, the network of dual-mode routers 204 (or crossbar switches or circuits) are coupled together via links 202 (e.g., 855 µm long 112-bit link). In some embodiments, dual-mode routers 204 have a scalable layout floorplan. In some embodiments, dual-mode crossbar switch 204 has dual-mode ports which are configurable to be a memory port or a network port as described with reference to FIGS. 3-4.

Referring back to FIG. 2A, crossbar switches 204 (which are also referred to as crossbar circuits, cross-point switches, matrix switches, coordinate switching circuits, crossbars, routers, etc.) are a collection of switches or multiplexers which are typically arranged in a matrix configuration. Crossbar switch 204 has multiple input and output lines that form a crossed pattern of interconnecting lines between which a connection may be established by closing a switch located at each intersection.

For example, if the crossbar switch has 'M' input lines and 'N' output lines, then the crossbar/router has a matrix with M×N cross-points or places where the connections cross. At each cross-point is a crossbar switch, and when the switch is closed, the switch connects one of the input lines to one of the output lines. Typically, concurrent connections in the crossbar switches do not prevent connecting other input lines to other output lines.

Energy-efficient, high-performance crossbar circuits are used for efficient on-chip communication. On-chip communication limits processor performance and power, and is becoming increasingly crucial because of process scaling and core-count increases, where core-count are count of processing elements (e.g., cores, caches, memory controllers, etc.). Crossbars enable data exchange among a set of ports having input and output lines. Crossbars may directly connect processing elements (e.g., compute cores, accelerator cores, etc.) to each other in a full crossbar. Or, crossbars may be networked to relay data between cores using a series of router switches.

In some embodiments, NoC 200 forms a routing network for processing elements 201 (e.g., intellectual property (IP) cores such as processors, accelerators, memories, graphic units, etc.) in an integrated circuit (IC) or a computer system.

ICs have traditionally used point-to-point interconnects where one wire is dedicated to a signal. Such traditional interconnections (and others such as shared buses or segmented buses with bridges) are not efficient with reference to one or more performance parameters such as power consumption and signal propagation speed, especially for large IC designs. On-chip communication is a performance and power limiter for multi-core processors. To enable communication between processing elements (such as processing elements 201), high performance, energy-efficient crossbar circuits are desired. NoCs can alleviate such physical limitations of traditional interconnections by providing wires in links that are shared by many signals. As such, a high level of parallelism is achieved with higher throughput and scalability. In some embodiments, all links 202 in NoC 200 can operate via dual-mode routers 204 simultaneously on different data packets.

In some embodiments, NoC 200 can span synchronous and asynchronous clock domains. For example, some processing elements 201 may generate synchronous output signals while some processing elements 201 may generate asynchronous signals, both of which can be exchanged between various processing elements via NoC 200. In some embodiments, NoC 200 manages the synchronization of data signals over links 202 by clocking the data output of the multiplexers of the dual-mode crossbar circuits. In some embodiments, NoC 200 design is asynchronous which allows for power savings when the links 202 are idle (i.e., signals on the links are not toggling) and/or dual-mode router 204 is idle.

In some embodiments, NoC 200 relays data between processing elements 201 using a mesh of dual-mode routers 204 and associated wires/links 202. Here, the topology of NoC is illustrated as a mesh topology. However, the embodiments are not limited to mesh topologies. For example, topologies such as ring, star, tree, fat tree, butterfly, torus, etc. can be used for NoC 200. In some embodiments, topologies of NoC 200 can be designed to reduce latency and provide greater connectivity. For example, NoC 200 may use wide data busses (e.g., 512 bits to 1024 bits) for its ports to improve network throughput. A zoomed version of one possible dual-mode router 204 is shown on the right side of FIG. 2A.

In this example, a 5-port dual-mode router is shown. However, the embodiments are not limited to 5-port dual-mode routers. For example, various embodiments are applicable for 3-port, 4-port, 6-port, etc. dual-mode routers. Continuing with the example of 5-port dual-mode router 204, in some embodiments, 5-port dual-mode router 204 comprises five ports—South Port, North Port, East Port, West Port, and Core Port. Each port includes wires (e.g., 112 bits, 512 bits, 1024 bits, etc.) for input and output. In some embodiments, at least one of the ports from among the five ports is a dual-mode port in that it can be configured to be a memory port or a network port.

The term "port" here generally refers to a hardware port. This hardware port is not pure software. The hardware port may comprise a wire interface for supporting a number of bits for input and/or output. For example, the wire interface may support 112 bits, 512 bits, 1024 bits, etc. for input and output. In some embodiments, the hardware port comprises more than a wire interface for information signals. For example, the wire interface may include interface for power and/or ground lines. The hardware port, if appropriate, may also include more than just a wire interface.

In some embodiments, North, South, East, and West Ports are used to communicate with other routers of NoC 200 and with its own ports. In some embodiments, Core Port is used to communicate with local logic (e.g., processing element 201 in close proximity to Core Port) and with the North, South, East, and West Ports. The network of wires shown in the center of 5-port dual-mode router 204 are managed or multiplexed by crossbar circuits (within dual-mode router 204) which are arranged in a scalable floorplan, according to some embodiments.

In some embodiments, the dual-mode crossbar circuit comprises one or more multiplexers (e.g., 2:1, 4:1, 8:1, etc. multiplexers) which are arranged such that signals on the interconnects extending in the x-direction are routed before signals on the interconnects extending in the y-direction. Such routing is referred to as x-first and y-second routing. One technical effect of such routing is to avoid deadlocks in data propagation. In some embodiments, the dual-mode crossbar circuit comprises one or more multiplexers which are fully connected. A fully connected dual-mode crossbar may have connections from all inputs to all outputs, in accordance with some embodiments. In this example, dual-mode router 204 is not fully connected because, for example, in the x-first and y-second routing there are no connections from a North/South port to an East/West port.

In some embodiments, the dotted box indicating voltage and/or clock domain around each router is a die boundary (which is a periphery of a die). In some embodiments, the die includes a processing element 201 (e.g., one or more processing cores), dual-mode crossbar switch (or router) 204, and within die interconnects or communication fabric 202 (also referred to as link). In some embodiments, the dies within NoC 200 are separated by short distances from one another. For example, the distance between the dies is less than 100s of microns apart.

In some embodiments, links 202 are positioned along the periphery of the die to allow the die to communicate with other dies over a short distance using on-package (or package-level) interconnects such as high-density interposers and Embedded Interconnect Bridge (EMIB) by Intel Corporation of Santa Clara, Calif. In other embodiments, other type of package-level interconnects may be used that provide high connection bandwidth density (e.g., greater than 1 Giga-Bytes per second per millimeter).

Figure 2C:
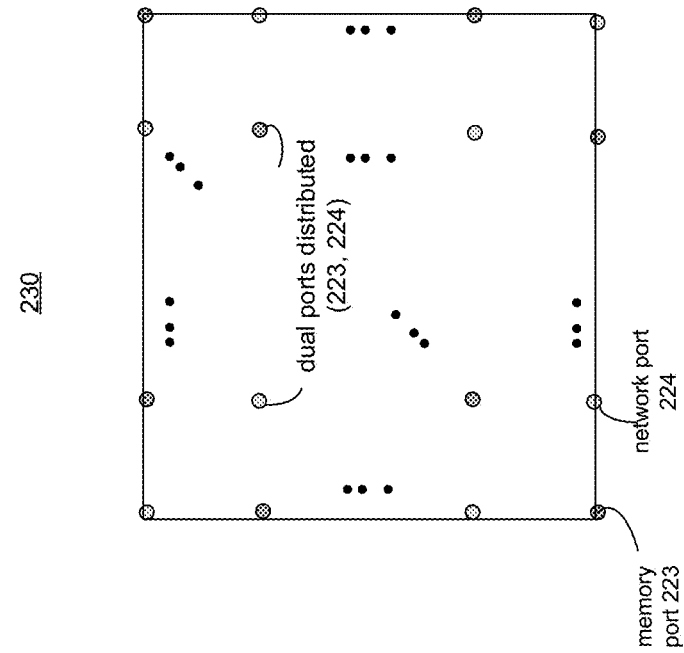
FIGS. 2B-C illustrate a NoC with distributed dual-mode input-output (IO) ports coupled to dual-mode switches, in accordance with some embodiments.
Figure 2B:
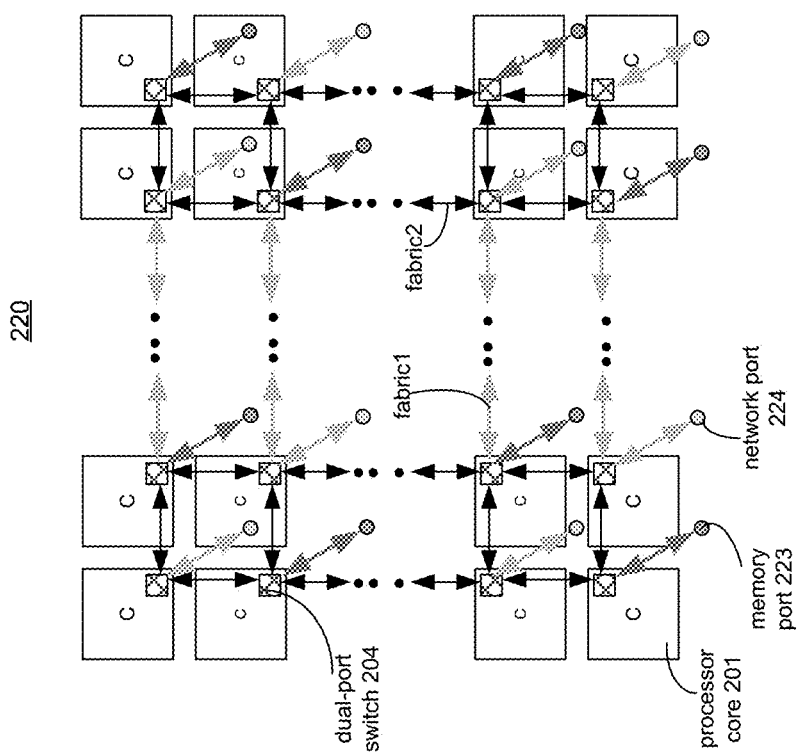

FIG. 2B illustrates NoC 220 with distributed dual-mode IO ports coupled to dual-mode switches, in accordance with some embodiments. It is pointed out that those elements of FIG. 2B having the same reference numbers (or names) as the elements of any other figure can operate or function in any manner similar to that described, but are not limited to such.

As described with reference to FIG. 2A, crossbar switches 204 are dual-mode crossbar switches. In some embodiments, dual-mode switch 204 can configure its IO ports to be either a memory port 223 or network port 224. Compared to the organization of ports 102 and 103 along the periphery 121 as shown in FIG. 1B, in some embodiments, memory ports 223 and/or network ports 224 are distributed throughout NoC 200. One such distribution of IO ports is shown in FIG. 2C as NoC 230. Referring back to FIG. 2B, while various embodiments are described with reference to the dual ports being memory ports 223 and network ports 224, the dual ports are not limited to these two types. Other types of ports may be used. For example, multi-ports (more than two) may be used instead of dual ports. As such, the multi-ports can be configured to operate as IOs for various possible interfaces.

Chip IOs, in general, are predominantly either memory or network interfaces. They could implement different interface protocols such as Double Data Rate (DDR) and Low Power DDR (LPDDR) for memories and Peripheral Component Interconnect Express (PCIe), Ethernet or any other custom protocols for network, where DDR is defined as JESD79-4 DDR4 by Joint Electron Device Engineering Council (JEDEC) Solid State Technology Association and published September 2012, LPDDR is defined by JESD209-4 LPDDR4 of JEDEC Solid State Technology Association and published August 2014, and PCIe is defined by PCR Express Base Specification Revision 3.1 Released Oct. 8, 2014. Other types of IOs can also be used. For example, the dual-port IOs can be configured as GPIO (General purpose IO) or side-band interface IO (for chip configuration).

In some embodiments, IO ports (e.g., memory ports 223 and/or network ports 224) are distributed across all switches (not just peripheral switches) coupling each IO port to one of the dual-mode switch 204, and therefore also associating each IO port to corresponding compute block (e.g., processor or accelerator core 201) that is connected to the same dual-mode switch 204. Distribution of IO ports across the on-die fabric helps to achieve higher fabric performance. Moreover, such association of IO port with compute blocks enables the use of computational capabilities in the block for processing ingress/egress packets to/from dual-mode switch 204.

In some embodiments, each of the IO ports is configurable. For example, an IO port can be configured to operate either as memory IO port 223 or network IO port 224. In some embodiments, in Processor Personality mode (e.g., when NoC 200 is to behave like a compute processor), a fraction of IO ports are configured as network IO ports 224 while rest are configured as memory IO ports 223, depending on the desired memory to network bandwidth ratio. In some embodiments, in Switch Personality mode (e.g., when NoC 200 is to behave more like a switch and/or network processor), all IO ports are configured as network IO ports 224. While the embodiments of FIG. 2B illustrate a mesh topology as a representative interconnect fabric, any other topologies such as rings, busses, or hierarchical networks can potentially be implemented.

In the embodiments of FIGS. 2B-C, compared to FIGS. 1A-B, white space is reduced. White space may be reduced because switch functionality is fused with processor component/NoC, by designing the component and NoC as illustrated. Distributed IO ports is one of the optimizations for fused NoC in order to achieve higher fabric performance and tight coupling of each switch IO port with a processor core.

Figure 3A:
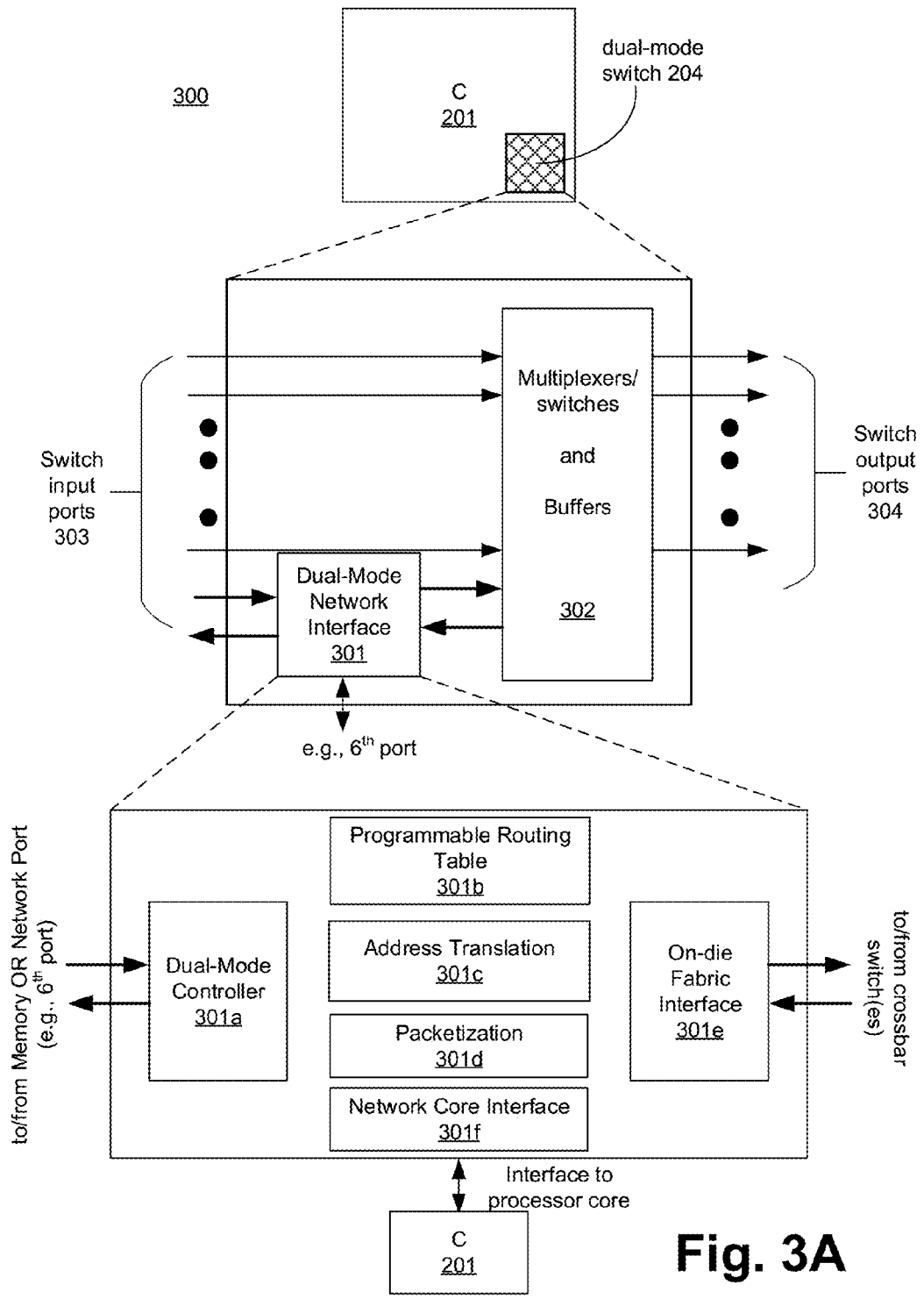
FIG. 3A illustrates a micro-architecture of the dual-port switch, in accordance with some embodiments of the disclosure.

FIG. 3A illustrates micro-architecture 300 of dual-port switch 204, in accordance with some embodiments of the disclosure. It is pointed out that those elements of FIG. 3A having the same reference numbers (or names) as the elements of any other figure can operate or function in any manner similar to that described, but are not limited to such.

In some embodiments, micro-architecture 300 of dual-mode switch 204 comprises Dual-Mode Network Interface block 301, multiplexers and buffers 302 of the crossbar switch, switch input ports 303, and switch output ports 304. The arrows for block 301 are part of switch input-output ports (e.g., external memory/network IO port). In some embodiments, Dual-Mode Network Interface block 301 includes Dual-Mode Controller 301a, Programmable Routing Table 301b, Address Translation or Mapping block 301c, Packetization block 301d, On-die Fabric Interface 301e, and Network Core Interface 301f.

Compared to the 5 port mesh router of FIG. 2A, here FIG. 2B there is one more port (e.g., memory/network dual mode IO) connected to this router, resulting in a 6 port router, where out of the 6 ports, 4 ports are North/East/South/West ports, one port is the core port, and $6^{th}$ port is an external (e.g., dual-mode or multi-mode) port. In some embodiments, merely this $6^{th}$ port has dual-mode or multi-mode network interface block connected to.

Referring back to FIG. 3A, switch input/output ports (303/304) correspond to North/East/South/West and core ports (as described with reference to FIG. 2A). Here, the input/output ports 303/304 may not have dual-mode network interface block 301. In some embodiments, the bottommost port in the unexpanded figure where 301 is shown is the $6^{th}$ port (e.g., external memory/network dual-mode port).

In some embodiments, Dual-Mode Controller 301a is operable to perform functions of a memory controller and a network controller. For example, when the IO port is configured to memory port 223, then Dual-Mode Controller 301a is also configured or programmed to be a memory controller. In some embodiments, when the IO port is configured to network port 224, then Dual-Mode Controller 301a is also configured or programmed to be a network controller.

Figure 4:
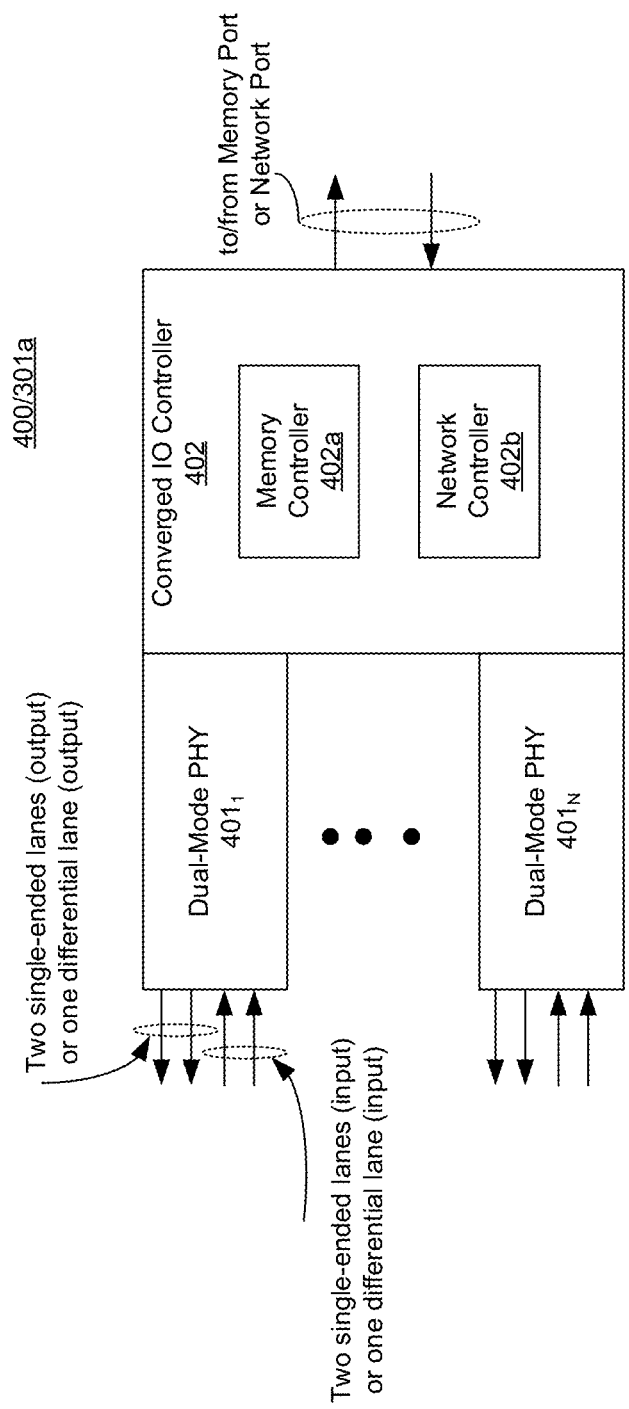
FIG. 4 illustrates a dual-mode controller and configurable IO of the dual-port switch, in accordance with some embodiments of the disclosure.

FIG. 4 illustrates dual-mode controller 400/301a and configurable IO of dual-mode switch 204, in accordance with some embodiments of the disclosure. It is pointed out that those elements of FIG. 4 having the same reference numbers (or names) as the elements of any other figure can operate or function in any manner similar to that described, but are not limited to such.

In some embodiments, dual-mode controller 400/301a comprises dual-mode PHY (e.g., Physical analog/digital) circuits $401_{1-N}$ (where 'N' is an integer) and Converged IO Controller 402. In some embodiments, Converged IO Controller 402 comprises Memory Controller 402a and Network Controller 402b. While Memory Controller 402a and Network Controller 402b are shown as two separate blocks, they can be unified in a way that they have shared logic. In some embodiments, some logic can be disabled or enabled for enabling a Memory Controller and vice versa.

In some embodiments, IO configurability is achieved through dual-mode PHY circuits $401_{1-N}$ and Converged IO Controller 402. In some embodiments, in dual-mode IOs, pair of pins (e.g., IO bumps) can either function as one differential IO pair for high speed signaling, or it can also function as two independent single-ended IOs for the memory interfaces. For example, when Converged IO Controller 402 is configured as network controller 402b, then the signals of dual-mode PHY circuits $401_{1-N}$ are transmitted and received as differential signals for network port 224. In another example, when Converged IO Controller 402 is configured as memory controller 402a, then the signals of dual-mode PHY circuits $401_{1-N}$ are transmitted and received as single-ended signals for memory port 223.

In some embodiments, Converged IO Controller 402 implements link-layer and transaction-layer protocols for both memory and network IO ports 223 and 224, respectively. In some embodiments, Converged IO Controller 402 can be configured to operate either as Memory IO controller 402a or Network IO controller 402b. This configuration can be initiated by software, firmware, or hardware, in accordance with various embodiments. Alternatively, in some embodiments, existing IP blocks (e.g., blocks 402a/b) for memory/network IO controllers can be multiplexed to drive Dual-Mode PHY circuits $401_{1-N}$ depending upon a required configuration.

In some embodiments, each IO controller connects to external memory/network IO ports 223/224 of on-die interconnect fabric. In some embodiments, multiple dual-mode PHYs are controlled by Converged IO Controller 402 depending upon the IO signaling rate and total bandwidth each of the controller is designed to support. For example, when high signaling rate and/or bandwidth (e.g., greater than 8 Giga-transfers per second) is desired, Converged IO Controller 402 configures dual-mode PHY circuits 401$_{1-N}$ so they transmit and receive signals as differential signals.

Referring back to FIG. 3A, micro-architecture 300 of switch 204 has micro-architectural enhancements over known switches. For example, in some embodiments, Programmable Routing Table 301b, Address Translation/remapping Table 301c, Packetization logic 301d, Network Core Interface 301f, and On-die Fabric Interface 301e are provided which are associated with dual-mode switch 204. In some embodiments, Dual-Mode Network Interface 301 provides protocol translation interfaces between external IO ports and On-die interconnect Fabric.

In some embodiments, Programmable Routing Table 301b is a software programmable structure which is used to look-up destination port ID (identifier) based on an address field in an incoming packet header. For example, operating system executing on NoC 200 can access Programmable Routing Table 301b which is stored in memory associated with switch 204. In some embodiments, Programmable Routing Table 301b is a hardware programmable structure which is accessible by software or hardware.

In some embodiments, entries of Programmable Routing Table 301b are configured based on system address map and personality of the fused component as shown by Programmable Routing Table 320 of FIG. 3B. Programmable Routing Table 320/301b is a simplified version of the table showing Address Fields, Destination Port IDs, and switch Personality types. For example, in the network personality mode, a packet arriving at an ingress port undergoes Programmable Routing Table 320/301b look-up in Dual-Port Network Interface 301. The values in the table are dummy values for illustrative purposes.

With reference to Table 320, Mask Value is a number. In some embodiments, an Address field in an incoming packet is ANDed with the Mask Value. As such, specific set of bits from the destination address are extracted. Here, Match Value is a number. In some embodiments, the extracted set of bits is compared (e.g., XORed) with the Match Value. As such, relative position/distance of destination address with respect to current address (i.e., address of the switch at which packet has arrived, and currently undergoing route table look-up) is identified. Here, Destination port ID is a value which is programmed for each entry depending upon the Mask/Match Values, personality of component (e.g., processor/switch) and topology of system-level interconnect fabric. In some embodiments, the table look-up happens in priority order starting from first entry to last entry.

In response to the look-up, a destination port ID is determined for the address field in the packet received at the ingress port. In some embodiments, Programmable Routing Table 320/301b entries are configured based on connectivity of the switch ports to system-level interconnect fabric. In some embodiments, once the destination IO port ID is extracted from Programmable Routing Table 320/301b, the packet is forwarded via on-die fabric 301e to the appropriate block-level switch to which the destination IO port is connected to.

Referring back to FIG. 3A, in some embodiments, Address Translation Table 301c can be used to optionally remap address spaces depending on "rule checks" configured in the translation table via system software. Rule check could be implemented in several possible ways. One such example is, if a destination address of an incoming packet falls within a certain range of addresses (e.g., as defined by upper and lower bounds programmed in the translation table), then the incoming address is remapped to another address by performing certain logical operations (e.g., AND, EXOR, OR, SHIFT, etc.) or arithmetic operations (e.g., Add, Subtract etc.) on the incoming destination address.

FIG. 3C illustrates an Address Translation/Mapping Table 330/301c, in accordance with some embodiments of the disclosure. Translation/Mapping Table 330/301c illustrates a lookup table listing a remapped address for an input address. Table 330/301c is a simplified version of an address translation table with dummy data. The table corresponds to rule check as described above, however, it is not limited to that specific example.

Referring back to FIG. 3A, the features of Programmable Routing Table 301b and Address Translation Table 301c are used to implement packet processing and software programmability features in switch personality of the fused component, in accordance with some embodiments. In some embodiments, after Programmable Routing Table 301b and/ or Address Translation Table 301c are used to get a new address and destination port ID, Packetization logic 301d generates a new packet for egress port 304 or for providing to compute block 201.

In some embodiments, Network Core Interface 301f interfaces to compute block 'C' 201 from Dual-Port Network Interface 301. In some embodiments, Network Core Interface 301f allows forwarding incoming packets or packets regenerated by Packetization logic 301d to processor/accelerator cores of compute block 201, in addition to sending/ receiving core packets from the switch network. In some embodiments, incoming packets on the switch ingress ports 303 can be conditionally redirected to the compute block 301 via Network Core Interface 301f. For example, the incoming packets can be redirected either depending on an address space range in which the packet destination address belongs to, or depending upon any other rule check or address transformation implemented in Programmable Routing Table 301b and Address Translation Table/logic 301c.

In some embodiments, packets redirected to compute block 201 are buffered into block-level local memories and processed by processor cores or special-purpose accelerators in compute block 201. In some embodiments, these processed packets are injected back into the network fabric by compute block 201, which are then forwarded to egress port(s) 304 of switch 204 depending upon either original or modified destination address in the packet header field.

In some embodiments, the entries in Address Translation Table 301c and Programmable Routing Table 301b in Dual-Mode Network Interface 301 can be reconfigured via system software running on compute blocks 201. As such, an entire system level interconnect fabric can be dynamically reconfigured via software at runtime in accordance with some embodiments.

Figure 5B:
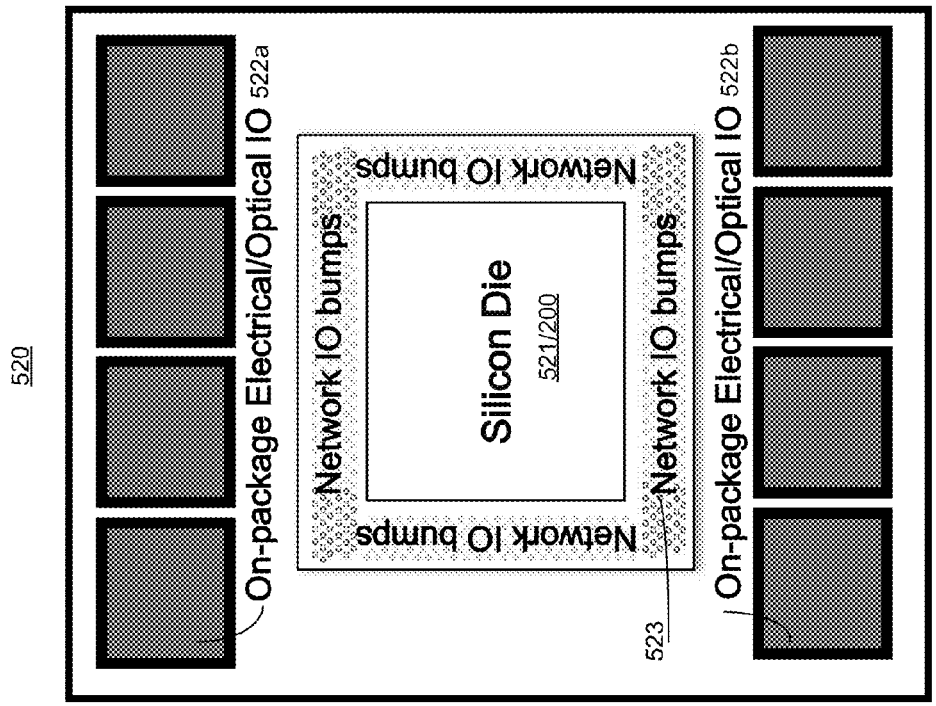
FIGS. 5A-B illustrate packaging configurations for processor and switch personalities, in accordance with some embodiments of the disclosure.
Figure 5A:
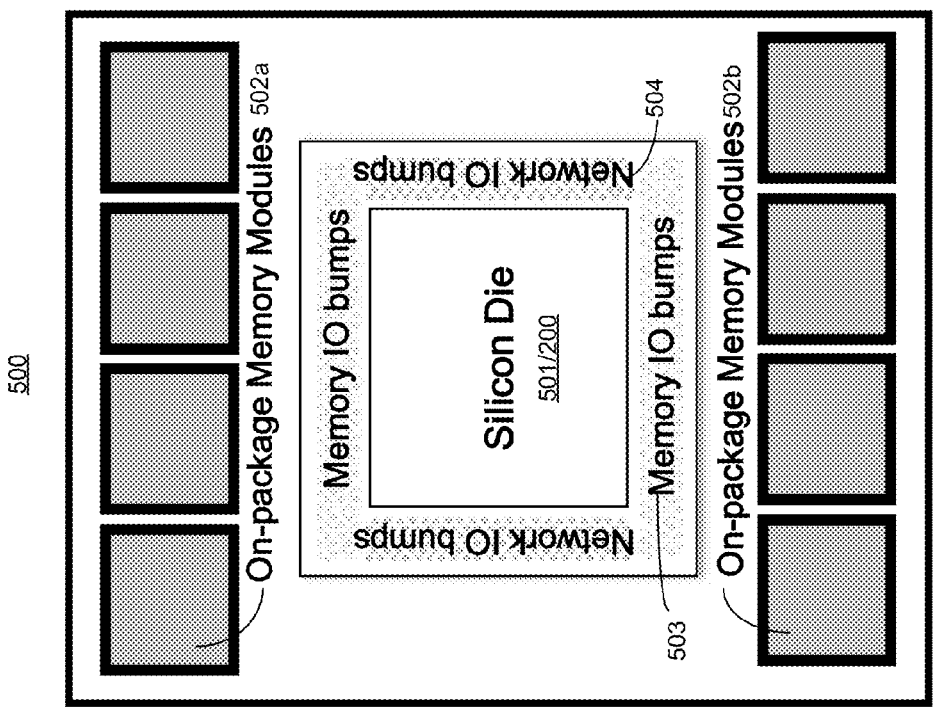

FIGS. 5A-B illustrate packaging configurations 500 and 520 for processor and switch personalities, respectively, in accordance with some embodiments of the disclosure. It is pointed out that those elements of FIGS. 5A-B having the same reference numbers (or names) as the elements of any other figure can operate or function in any manner similar to that described, but are not limited to such.

Packaging configuration 500 illustrates a silicon die 501 such as NoC 200, on-package memory modules 502a/b, memory IO bumps 503, and network IO bumps 504. In processor personality, as shown by packing configuration 500 of FIG. 5A, a fraction of IO bumps of the die are dual-mode and are configured as memory IO bumps 503, in accordance with some embodiments. In some embodiments, the rest of the IOs are single-mode, and are implemented as network IO bumps 504. Here, dual-mode bumps refer to bumps that are coupled to dual-mode IO ports which are configured by dual-mode switches 204, while single-mode bumps are traditional bumps which are non-configurable. In some embodiments, memory IO bumps 503 couple to on-package memory modules 502a and 502b on package top-side and bottom-side, respectively, (e.g., north and south sides). In some embodiments, network IO bumps 504 break-out from package land-side (e.g., East and Eest sides).

Packaging configuration 520 illustrates a silicon die 521 such as NoC 200, on-package connector modules 522a/b, and network IO bumps 523. In some embodiments, the on-package connector modules 522a/b are electrical or optical IO modules. In some embodiments, in the switch personality, as shown by packing configuration 520 of FIG. 5B, the dual mode IOs which connect to package top-side module 522a are configured as network IO bumps 523. In some embodiments, the on-package connector modules 522a/b can also be designed as a multi-mode module. In some embodiments, the multi-mode module can be populated with either on-package memory stacks, or it can also interface with active optical cables or passive electrical cables.

In some embodiments, in the switch personality, the top-side IO can be used for electrical signaling or can be directly interfaced with optical cables, without any need for off-package trans-receivers for electrical-optical conversion. In some embodiments, bumps which break-out from the package land-side continue to function as network IO in the switch functionality. In some embodiments, some of the dual-mode IOs may potentially be unused.

FIG. 6A illustrates flowchart 600 of a method for configuring a fused component 200 as a processor, according to some embodiments of the disclosure. It is pointed out that those elements of FIG. 6A having the same reference numbers (or names) as the elements of any other figure can operate or function in any manner similar to that described, but are not limited to such.

Although the blocks in the flowchart with reference to FIG. 6A are shown in a particular order, the order of the actions can be modified. Thus, the illustrated embodiments can be performed in a different order, and some actions/blocks may be performed in parallel. Some of the blocks and/or operations listed in FIG. 6A are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 601, Converged IO Controller 402 of dual-mode crossbar switch 204 is configured by software (e.g., via an operating system or any other software) or hardware (e.g., by jumpers on a board) to be a memory controller 402a. At block 602, Converged IO Controller 402 or any other suitable logic of dual-mode crossbar switch 204 configures Dual-Mode PHY circuits $401_{1-N}$ to be single-ended signaling circuits for communicating with a memory.

At block 603, a user (e.g., machine, software, or human) may program or configure Programmable Routing Table 301b to change one or more destination IO ports associated with an address field in an incoming packet. In some embodiments, the configuration of programming of Programmable Routing Table 301b can be done at power-up or dynamically at run-time. At block 604, an incoming packet is forwarded to processor and/or accelerator core 201 (e.g., compute block 'C') by Network Core Interface 301f. In some embodiments, an incoming packet received at ingress ports 303 is routed to switch output ports 304 according to a fixed Routing Table (not shown).

FIG. 6B illustrates flowchart 620 of a method for configuring fused component 200 as a switch, according to some embodiments of the disclosure. It is pointed out that those elements of FIG. 6B having the same reference numbers (or names) as the elements of any other figure can operate or function in any manner similar to that described, but are not limited to such.

Although the blocks in the flowchart with reference to FIG. 6B are shown in a particular order, the order of the actions can be modified. Thus, the illustrated embodiments can be performed in a different order, and some actions/blocks may be performed in parallel. Some of the blocks and/or operations listed in FIG. 6B are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 621, Converged IO Controller 402 of dual-mode crossbar switch 204 is configured by software (e.g., via an operating system or any other software) or hardware (e.g., by jumpers on a board) to be a network controller 402b. At block 622, Converged IO Controller 402 or any other suitable logic of dual-mode crossbar switch 204 configures Dual-Mode PHY circuits $401_{1-N}$ to be differential-ended signaling circuits for communicating with a network module. At block 623, a user (e.g., machine, software, or human) may program or configure Programmable Routing Table 301b to change one or more destination IO ports associated with an address field in an incoming packet. In some embodiments, the configuration of programming of Programmable Routing Table 301b can be done at power-up or dynamically at run-time. At block 624, an incoming packet is forwarded to processor and/or accelerator core 201 (e.g., compute block 'C') by Network Core Interface 301f In some embodiments, an incoming packet received at ingress ports 303 is routed to switch output ports 304 according to a fixed Routing Table (not shown).

Figure 7:
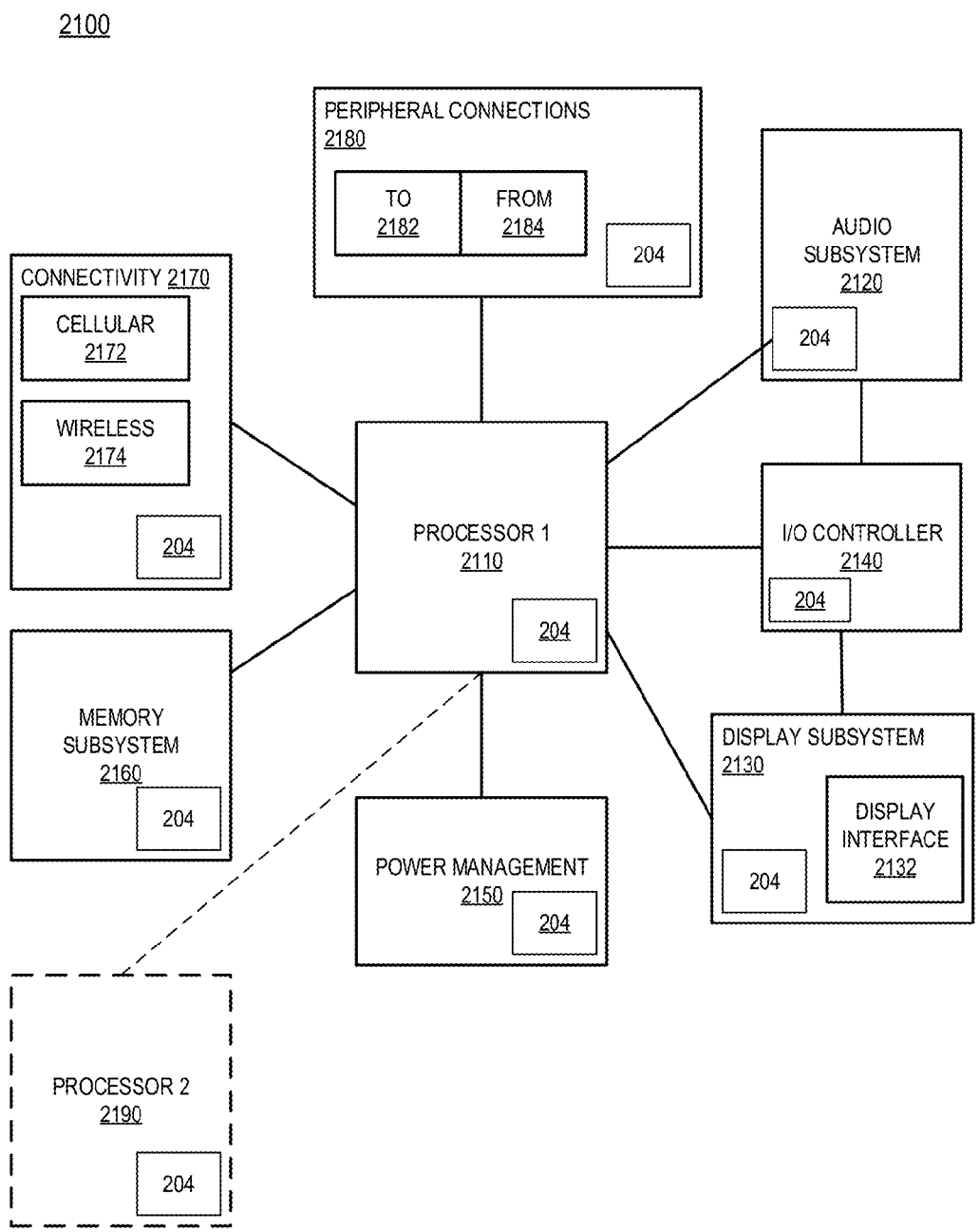
FIG. 7 illustrates a smart device or a computer system or a SoC (System-on-Chip) with one or more dual-mode switches, according to some embodiments.

FIG. 7 illustrates a smart device or a computer system or a SoC (System-on-Chip) 2100 with dual-mode switches 204, according to some embodiments. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110 with dual-mode switches 204, according to some embodiments discussed. Other blocks of the computing device 2100 may also include dual-mode switches 204, according to some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110. In some embodiments, audio subsystem 2120 includes Routers 101 having scalable floorplans, according to some embodiments.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user. In some embodiments, display subsystem 2130 includes Routers 101 having scalable floorplans, according to some embodiments.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices. In some embodiments, I/O controller 2140 includes Routers 101 having scalable floorplans, according to some embodiments.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. In some embodiments, power management 2150 includes crossbar circuits 102 with scalable floorplan, according to some embodiments. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In some embodiments, memory subsystem 2160 includes Routers 101 having scalable floorplan, according to some embodiments.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices. In some embodiments, connectivity 2170 includes Routers 101 having scalable floorplan, according to some embodiments.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems. In some embodiments, peripheral connections 2180 2120 includes Routers 101 having scalable floorplan, according to some embodiments.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a Network-On-Chip fabric having crossbar switches and distributed ingress and egress ports; and a dual-mode network interface coupled to at least one crossbar switch, the dual-mode network interface is to include: a dual-mode circuitry; and a controller operable to: configure the dual-mode circuitry to transmit and receive differential signals via the egress and ingress ports, respectively, and configure the dual-mode circuitry to transmit and receive signal-ended signals via the egress and ingress ports, respectively.

In some embodiments, the controller is an input-output (IO) port controller and comprises: a network controller which is operable to configure the dual-mode circuitry to transmit and receive the differential signals via the egress and ingress ports, respectively. In some embodiments, the controller is an IO port controller and comprises: a memory controller which is operable to configure the dual-mode circuitry to transmit and receive the signal-ended signals via the egress and ingress ports, respectively. In some embodiments, the memory controller and network controller are selectable by a multiplexer.

In some embodiments, the dual-mode network interface comprises: a programmable routing table which is to provide a destination port identifier according to an address field in an incoming packet header of an incoming packet received by a port of the crossbar circuit. In some embodiments, the programmable routing table is configured according to connectivity of input or output ports, of the crossbar switch, to a system-level interconnect fabric. In some embodiments, the dual-mode network interface comprises: an address translation table which is operable to remap address spaces in the programmable routing table.

In some embodiments, the apparatus comprises a processor core coupled to the at least one crossbar switch. In some embodiments, the dual-mode network interface comprises: a processor interface to forward the incoming packet to the processor core according to the destination port identifier. In some embodiments, the apparatus comprises a local memory which is to store the forwarded incoming packet before the forwarded incoming packet is received by the processor core for processing.

In some embodiments, the apparatus comprises: an accelerator core coupled to the crossbar switch. In some embodiments, the dual-mode network interface comprises: a processor interface to forward the incoming packet to the accelerator core according to the destination port identifier. In some embodiments, the apparatus comprises a local memory which is to store the forwarded incoming packet before the forwarded incoming packet is received by the accelerator core for processing.

In another example, a system is provided which comprises: a package which includes: on-package memory modules; a die coupled to the on-package memory modules, wherein the die comprises: a Network-On-Chip fabric using crossbar switches, having distributed ingress and egress ports; and a dual-mode network interface coupled to at least one crossbar switch, the dual-mode network interface is to include: a dual-mode circuitry; and a controller operable to configure the dual-mode circuitry to transmit and receive differential signals via the egress and ingress ports, respectively.

In some embodiments, the on-package memory modules are arranged on opposite sides or periphery of the die. In some embodiments, the dual-mode network interface comprises: a programmable routing table which is to provide a destination port identifier according to an address field in an incoming packet header of an incoming packet received by a port of the crossbar circuit; an address translation table which is operable to remap address spaces in the programmable routing table; and a processor interface to forward the incoming packet to the processor core according to the destination port identifier.

In some embodiments, the programmable routing table is configured according to connectivity of input and output ports, of the crossbar switch, to a system-level interconnect fabric. In some embodiments, the die comprises a local memory which is to store the forwarded incoming packet before the forwarded incoming packet is received by the processor core for processing.

In another example, a system is provided which comprises: a package which includes: on-package electrical or optical modules; a die coupled to the on-package electrical or optical modules, wherein the die has distributed ingress and egress ports, the die comprises: an accelerator core; a crossbar switch coupled to the accelerator core; and a dual-mode network interface coupled to the crossbar switch, the dual-mode network interface is to include: a dual-mode port circuitry; and a controller operable to configure the dual-port circuitry to transmit and receive differential-ended signals, to and from at least one of the on-package electrical or optical modules, via the egress and ingress ports, respectively.

In some embodiments, the on-package electrical or optical modules are arranged on opposite sides of the die. In some embodiments, the dual-mode network interface comprises: a programmable routing table which is to provide a destination port identifier according to an address field in an incoming packet header of an incoming packet received by a port of the crossbar switch; an address translation table which is operable to remap address spaces in the programmable routing table; and a processor interface to forward the incoming packet to the accelerator core according to the destination port identifier.

In some embodiments, the programmable routing table is configured according to connectivity of input and output ports to a system-level interconnect fabric. In some embodiments, the die comprises a local memory which is to store the forwarded incoming packet before the forwarded incoming packet is received by the accelerator core for processing.

In another example, a method comprises: setting a controller to be a memory controller, the controller being part of a dual-mode network interface coupled to at least one crossbar switch; and configuring a dual-mode circuitry to single-ended signaling, the dual-mode circuitry being part of the dual-mode network interface. In some embodiments, the dual-mode network interface comprises a programmable routing table, and wherein the method comprises: providing a destination port identifier according to an address field in an incoming packet header of an incoming packet received by a port of the at least one crossbar circuit; and programming the programmable routing table.

In some embodiments, the dual-mode network interface comprises an address translation table, and wherein the method comprises: remapping address spaces in the programmable routing table. In some embodiments, a processor core is coupled to the at least one crossbar switch, and wherein the method comprises: forwarding the incoming packet to the processor core according to the destination port identifier. In some embodiments, the method comprises: storing, in a local memory, the forwarded incoming packet before the forwarded incoming packet is received by the processor core for processing.

In another example, an apparatus comprises: means for setting a controller to be a memory controller, the controller being part of a dual-mode network interface coupled to at least one crossbar switch; and means for configuring a dual-mode circuitry to single-ended signaling, the dual-mode circuitry being part of the dual-mode network interface. In some embodiments, the dual-mode network interface comprises a programmable routing table, and wherein the apparatus comprises: means for providing a destination port identifier according to an address field in an incoming packet header of an incoming packet received by a port of the at least one crossbar circuit; and means for programming the programmable routing table.

In some embodiments, the dual-mode network interface comprises an address translation table, and wherein the apparatus comprises: means for remapping address spaces in the programmable routing table. In some embodiments, a processor core is coupled to the at least one crossbar switch, and wherein the apparatus comprises: means for forwarding the incoming packet to the processor core according to the destination port identifier. In some embodiments, the apparatus comprises: means for storing the forwarded incoming packet before the forwarded incoming packet is received by the processor core for processing.

In another example, a method is provided which comprises: setting a controller to be a network controller, the controller being part of a dual-mode network interface coupled to at least one crossbar switch; and configuring a dual-mode circuitry to differential-ended signaling, the dual-mode circuitry being part of the dual-mode network interface.

In some embodiments, the dual-mode network interface comprises a programmable routing table, and wherein the method comprises: providing a destination port identifier according to an address field in an incoming packet header of an incoming packet received by a port of the at least one crossbar circuit; and programming the programmable routing table. In some embodiments, the dual-mode network interface comprises an address translation table, and wherein the method comprises: remapping address spaces in the programmable routing table. In some embodiments, an accelerator core is coupled to the at least one crossbar switch, and wherein the method comprises: forwarding the incoming packet to the accelerator core according to the destination port identifier. In some embodiments, the method comprises: storing the forwarded incoming packet before the forwarded incoming packet is received by the accelerator core for processing.

In another example, an apparatus is provided which comprises: means for setting a controller to be a network controller, the controller being part of a dual-mode network interface coupled to at least one crossbar switch; and means for configuring a dual-mode circuitry to differential-ended signaling, the dual-mode circuitry being part of the dual-mode network interface. In some embodiments, the dual-mode network interface comprises a programmable routing table, and wherein the apparatus comprises: means for providing a destination port identifier according to an address field in an incoming packet header of an incoming packet received by a port of the at least one crossbar circuit; and means for programming the programmable routing table.

In some embodiments, the dual-mode network interface comprises an address translation table, and wherein the apparatus comprises: means for remapping address spaces in the programmable routing table. In some embodiments, an accelerator core is coupled to the at least one crossbar switch, and wherein the apparatus comprises: means for forwarding the incoming packet to the accelerator core according to the destination port identifier. In some embodiments, the apparatus comprises: means for storing the forwarded incoming packet before the forwarded incoming packet is received by the accelerator core for processing.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a Network-On-Chip fabric comprising a plurality of interconnected crossbar switches, wherein each of the plurality of crossbar switches comprises two or more ingress ports and two or more egress ports, and the two or more ingress ports and two or more egress ports are each configurable as either memory ports or network ports; and
   a dual-mode network interface coupled to at least one crossbar switch, the dual-mode network interface is to include:
      a dual-mode circuitry; and
      a controller operable to:
         configure the dual-mode circuitry to transmit and receive differential signals via the egress and ingress ports, respectively, and
         configure the dual-mode circuitry to transmit and receive signal-ended signals via the egress and ingress ports, respectively.

2. The apparatus of claim 1, wherein the controller is an input-output (IO) port controller and comprises:
   a network controller which is operable to configure the dual-mode circuitry to transmit and receive the differential signals via the egress and ingress ports, respectively.

3. The apparatus of claim 2, wherein the controller is an IO port controller and comprises:
   a memory controller which is operable to configure the dual-mode circuitry to transmit and receive the signal-ended signals via the egress and ingress ports, respectively.

4. The apparatus of claim 3, wherein the memory controller and network controller are selectable by a multiplexer.

5. The apparatus of claim 1, wherein the dual-mode network interface comprises:
   a programmable routing table which is to provide a destination port identifier according to an address field in an incoming packet header of an incoming packet received by a port of the crossbar circuit.

6. The apparatus of claim 5, wherein the programmable routing table is configured according to connectivity of input or output ports, of the crossbar switch, to a system-level interconnect fabric.

7. The apparatus of claim 5, wherein the dual-mode network interface comprises:
   an address translation table which is operable to remap address spaces in the programmable routing table.

8. The apparatus of claim 5, further comprising a processor core coupled to the at least one crossbar switch.

9. The apparatus of claim 8, wherein the dual-mode network interface comprises:
   a processor interface to forward the incoming packet to the processor core according to the destination port identifier.

10. The apparatus of claim 9 comprises a local memory which is to store the forwarded incoming packet before the forwarded incoming packet is received by the processor core for processing.

11. The apparatus of claim 5 comprises an accelerator core coupled to the crossbar switch.

12. The apparatus of claim 11, wherein the dual-mode network interface comprises:
   a processor interface to forward the incoming packet to the accelerator core according to the destination port identifier.

13. The apparatus of claim 12 comprises a local memory which is to store the forwarded incoming packet before the forwarded incoming packet is received by the accelerator core for processing.

14. A system comprising:
   a package which includes:
      on-package memory modules;
      a die coupled to the on-package memory modules, wherein the die comprises:
         a Network-On-Chip fabric comprising a plurality of interconnected crossbar switches, wherein each of the plurality of crossbar switches comprises two or more ingress and egress ports, and the two or more ingress ports and two or more egress ports are each configurable as either memory ports or network ports; and
         a dual-mode network interface coupled to at least one crossbar switch, the dual-mode network interface is to include:
            a dual-mode circuitry; and
            a controller operable to configure the dual-mode circuitry to transmit and receive differential signals via the egress and ingress ports, respectively.

15. The system of claim 14, wherein the on-package memory modules are arranged on opposite sides or periphery of the die.

16. The system of claim 14, wherein the dual-mode network interface comprises:
   a programmable routing table which is to provide a destination port identifier according to an address field in an incoming packet header of an incoming packet received by a port of the crossbar circuit;
   an address translation table which is operable to remap address spaces in the programmable routing table; and
   a processor interface to forward the incoming packet to the processor core according to the destination port identifier.

17. The system of claim 16, wherein the programmable routing table is configured according to connectivity of input and output ports, of the crossbar switch, to a system-level interconnect fabric.

18. The system of claim 16, wherein the die comprises a local memory which is to store the forwarded incoming packet before the forwarded incoming packet is received by the processor core for processing.

19. A system comprising:
a package which includes:
on-package electrical or optical modules;
a die coupled to the on-package electrical or optical modules, wherein the die has distributed ingress and egress ports, the die comprises:
an accelerator core;
a crossbar switch coupled to the accelerator core; and
a dual-mode network interface coupled to the crossbar switch, wherein the crossbar switch comprises two or more ingress ports and two or more egress ports, the two or more ingress ports and two or more egress ports are each configurable as either memory ports or network ports, and the dual-mode network interface is to include:
a dual-mode port circuitry; and
a controller operable to configure the dual-port circuitry to transmit and receive differential-ended signals, to and from at least one of the on-package electrical or optical modules, via the egress and ingress ports, respectively.

20. The system of claim 19, wherein the on-package electrical or optical modules are arranged on opposite sides of the die.

21. The system of claim 19, wherein the dual-mode network interface comprises:
a programmable routing table which is to provide a destination port identifier according to an address field in an incoming packet header of an incoming packet received by a port of the crossbar switch;
an address translation table which is operable to remap address spaces in the programmable routing table; and
a processor interface to forward the incoming packet to the accelerator core according to the destination port identifier.

22. The system of claim 21, wherein the programmable routing table is configured according to connectivity of input and output ports to a system-level interconnect fabric.

23. The system of claim 21, wherein the die comprises a local memory which is to store the forwarded incoming packet before the forwarded incoming packet is received by the accelerator core for processing.

* * * * *